United States Patent [19]

Degen et al.

[11] Patent Number: 5,232,600
[45] Date of Patent: Aug. 3, 1993

[54] HYDROPHOBIC MEMBRANES

[75] Inventors: Peter J. Degen, Huntington; Isaac Rothman, Brooklyn; Thomas C. Gsell, Glen Cove, all of N.Y.

[73] Assignee: Pall Corporation, Glen Cove, N.Y.

[21] Appl. No.: 965,538

[22] Filed: Oct. 23, 1992

Related U.S. Application Data

[60] Continuation of Ser. No. 537,793, Jun. 14, 1990, abandoned, which is a division of Ser. No. 351,219, May 15, 1989, Pat. No. 4,954,256.

[51] Int. Cl.$^5$ .............................................. B01D 71/34
[52] U.S. Cl. ................................. 210/640; 210/490; 210/500.35; 210/500.40
[58] Field of Search .................... 55/16, 158; 210/640, 210/651, 652, 490, 500.35, 500.36, 500.42, 500.41; 421/245; 521/31, 53, 137, 134

[56] References Cited

U.S. PATENT DOCUMENTS

| | | | |
|---|---|---|---|
| 2,956,899 | 10/1960 | Cline | 117/47 |
| 3,188,228 | 6/1965 | Magat et al. | 117/62 |
| 3,268,622 | 8/1966 | Stanton et al. | 260/873 |
| 3,412,175 | 11/1968 | Magat et al. | 260/857 |
| 3,565,780 | 2/1971 | Zimmerman | 204/159.15 |
| 4,385,130 | 5/1983 | Molinski et al. | 521/31 |
| 4,481,306 | 11/1984 | Markus et al. | 521/31 |
| 4,506,035 | 3/1985 | Barnett et al. | 521/53 |
| 4,602,045 | 7/1986 | Markus et al. | 521/27 |
| 4,613,441 | 9/1986 | Kohno et al. | 210/500.36 |
| 4,776,959 | 10/1988 | Kasai et al. | 210/490 |
| 4,985,280 | 1/1991 | Scholz et al. | 427/244 |

FOREIGN PATENT DOCUMENTS

| | | |
|---|---|---|
| 0057065 | 4/1982 | European Pat. Off. |
| 0144054 | 12/1985 | European Pat. Off. |
| 0216622 | 4/1987 | European Pat. Off. |
| 2585025 | 1/1987 | France |
| 2608452 | 6/1988 | France |
| 2014184A | 8/1979 | United Kingdom |

*Primary Examiner*—Frank Spear
*Attorney, Agent, or Firm*—Leydig, Voit & Mayer

[57] ABSTRACT

A process for the preparation of a microporous polymeric membrane is provided which includes polymerizing a polymerizable fluorine-containing monomer in the presence of a microporous polymeric membrane substrate such that the fluorine-containing monomer forms a polymeric superstrate that is permanently chemically bonded to all surfaces of the membrane. A device is also provided for processing fluids which incorporates a microporous polymeric membrane having a CWST of less than about 28 dynes/cm and includes a microporous polymeric membrane substrate formed from a material such as a fluoropolymer and, permanently chemically bonded to all portions of the surface thereof is a superstrate, which may be a polymer or copolymer derived from a monomer(s), having an ethylenically unsaturated group and a perfluoroalkyl group. A gas filtration/drying process, a method of venting a gas from a vessel and a method of separating a gas from a liquid in a gas/liquid mixture using a microporous polymeric membrane having a CWST less than about 28 dynes/cm which includes a microporous polymeric membrane substrate and a superstrate fluoropolymer permanently chemically bonded to all portions of the membrane substrate are also provided.

31 Claims, No Drawings

HYDROPHOBIC MEMBRANES

This application is a continuation of application Ser. No. 07/537,793, filed Jun. 14, 1990, now abandoned, which is a division of application Ser. No. 07/351,219 filed May 15, 1989, now U.S. Pat. No. 4,454,256.

TECHNICAL FIELD

This invention relates to a hydrophobic microporous membrane whose wetting characteristics can be controlled so that the maximum surface tension of liquids which will wet the membrane is less than about 28 dynes/cm. This invention also relates to a method for making such membranes.

BACKGROUND OF THE INVENTION

Microporous membranes, i.e., thin sheets of material having pores from a few micrometers in diameter down to about 0.05 µm in diameter, have long been known. Such membranes may be made out of many different materials such as naturally occurring polymers, synthetic polymers, and ceramics. Depending upon the material from which the membrane is made, its wetting characteristics may differ greatly.

Liquid-repelling membranes often find use in filtration of gases, venting filters, and gas vents. Such membranes are herein referred to as "hydrophobic" even though, as will be clear from the context, liquids other than water (surface tension about 72.4 dynes/cm) are repelled by such membranes. Hydrophobic membranes are effective in these applications because they will allow gases and vapors, which have low surface tensions, to pass through the membrane while excluding materials with high surface tensions, for example, many liquids, from the membrane. For example, a gas filter will be effective if it allows only gas to pass but will not allow drops of liquid such as steam condensate, pump oil droplets, or other mists to penetrate and fill (and thereby block) the pores of the filter.

Frequently, these situations are encountered by filters used to sterilize the air feed to a biological fermentor. These filters are often sterilized after installation by exposure to steam. Should steam condensate penetrate and remain in the filter membrane the membrane would become blocked to further steam and subsequent air flow during use. Similarly, if water or oil droplets from air compressors or other sources should penetrate the filter membrane during use, the membrane would become blocked and reduce air flow during further use.

Hydrophobic membranes are also used in vent filters. In this application they protect the cleanliness of a liquid inside a vessel while permitting the vapor in the head space of that vessel to flow freely, both into and out of the vessel, as that vessel is filled and/or depleted of its contents. It frequently occurs that the liquid in such a vented vessel contacts the filter membrane in vent filters due to splashing or overfilling the vessel. If the membrane is wetted upon contact with the liquid, the liquid will penetrate the membrane and fill its pores, eliminating free flow of gas through the filter. Restrictions in flow through the vent will cause reduced drainage of liquid from the vessel and in some instances, collapse of the vessel itself. To perform effectively in such applications, the membrane must not be wetted by the liquid upon contact with it.

Hydrophobic membranes are also used in gas venting applications where the membrane is in constant contact with a liquid containing bubbles of gas. In such applications the membrane must serve as a barrier to the liquid and contain it while permitting the gas in the liquid to escape through the membrane. The membrane also serves as a filter to protect the contained liquid from contamination from the environment to which the gas escapes. In such applications, too, the membrane must not be wetted by the liquid upon contact with it. If the liquid were to wet the membrane, the liquid would penetrate the membrane, flow through it, and be lost from its contained system. Furthermore, the membrane would then be blocked by the liquid and no longer will be permeable to gas. It would then be unable to function as a vent.

In many of the above applications the membrane must behave as a sterilizing barrier; that is, it must be completely bacterially retentive. Not only must the membrane itself have such a small pore size that it can perform such a function, but also the device must be completely sealed so that it will not leak or bypass. To qualify for use in such critical applications it must be possible to test the device in order to determine that there are no faults and to ensure its ability to function.

Most frequently this is done by means of tests such as "bubble point" or "pressure hold" tests. These tests are referred to as integrity tests and are well known to those skilled in the art. They make use of the capillary properties of microporous membranes when fully wetted with a suitable test liquid. To be effective in such gas and vent filter applications, the filter membrane of choice must completely reject the liquids with which it may come in contact during use. However, it must also be able to be fully wetted by a suitable liquid used for testing the integrity of the filter or device. The wetting characteristics of the membrane must therefore be controlled carefully so that the membrane will not be wetted by most liquids encountered during fluid handling operations yet will be easily and completely wetted by special fluids used for carrying out integrity tests.

The ability of a solid surface to be wetted upon contact with a liquid depends upon the surface tension of the liquid and the surface free energy of the solid surface. In general, if the surface tension of the liquid is less than the surface free energy of the solid surface, the surface will be spontaneously wetted by that liquid. An empirical wetting property of a porous matrix, its critical wetting surface tension (CWST), can easily be determined. The CWST of a porous matrix such as a microporous membrane may be determined by finding the liquid having the highest surface tension within a homologous series of inert liquids which will spontaneously wet the porous matrix. For the purposes of this disclosure a porous membrane being "spontaneously wetted" means that when such a membrane is placed in contact with a liquid that liquid is drawn into the porous structure of the membrane within a few seconds without the application of external pressure. Liquids having surface tensions below the CWST of the porous matrix will wet it; liquids having surface tensions above the CWST of the porous matrix will not wet it and will be excluded.

Membranes made of materials which contain only non-polar groups and which have low critical surface tensions are not spontaneously wetted by liquids having high surface tensions, for example, water and most aqueous solutions. Microporous membranes made of non-polar materials such as polypropylene, poly(vinylidene fluoride), and polytetrafluoroethylene are available from Celanese, Millipore, and Gore Co., respectively. These membranes are naturally hydrophobic and are not spontaneously wetted by water. Such membranes have CWSTs ranging from about 28 to about 35 dynes/cm, depending on the material from which the membrane is made.

The microporous membranes which will be most useful as air filters, vent filters, and air vents will be those membranes which have as low a CWST as can be obtained in order to avoid penetration of the pores of the membrane by liquids with which they come in contact when in use. Currently the microporous membranes commercially available which have the lowest CWST are microporous membranes made of polytetrafluoroethylene, or PTFE. Such membranes are sold by the Gore Company and by Sumitomo Electric, Incorporated, among others and are available having a limited number of pore sizes ranging from 0.05 μm to 1 μm.

The CWST of these PTFE membranes is about 28 dynes/cm, which means that liquids having surface tensions equal to or lower than this value will spontaneously wet these membranes. Liquids having surface tensions higher than 28 dynes/cm will not spontaneously wet the membranes. Therefore, these PTFE membranes will function effectively in vents, vent filters, and gas filters as long as the membrane is not contacted with liquids having surface tensions of 28 dynes/cm or less. However, many aqueous solutions, chemicals, and many solvents and oils have low surface tensions and will wet PTFE membranes, either spontaneously or if modest pressure is accidentally applied. If the surface tension of the liquid is above the CWST of the membrane, the liquid can be forced to wet the membrane under pressure. The amount of pressure required is small if the difference between the surface tension of the liquid and the CWST of the membrane is small.

A microporous material which has a CWST much less than that of PTFE membranes would make accessible membranes that could be used in applications involving a greater variety of chemicals and fluids. In addition, while PTFE membranes are commercially available, they are very expensive and are difficult to use in an economical manner. PTFE membranes are not available having all desired pore sizes. Furthermore, PTFE is degraded severely by radiation, making it an undesirable material for use in vents and filters for sterile medical applications, where sterilization by means of radiation is the most economical and safe method of sterilizing these products after manufacture.

It is an object, therefore, of this invention to provide a microporous membrane which has a CWST controlled to a value significantly less than that of a membrane made of PTFE and yet which is above that of certain liquids useful as integrity test fluids, said membrane being economical to produce and capable of being made having a wide range of pore sizes in a controlled manner from materials resistant to damage by high doses of radiation, particularly doses associated with sterilization.

It is also an object of this invention to provide devices for processing fluids which use such a hydrophobic membrane to separate a gas but retain a liquid.

It is a further object to provide methods of using the hydrophobic membranes of the invention, for example, in gas filtration/drying, as a venting filter, or as a gas/liquid separator.

SUMMARY OF THE INVENTION

The membranes of this invention are hydrophobic microporous polymeric membranes having a CWST from less than about 27 dynes/cm. These membranes are characterized by having a superstrate fluoropolymer (that is, a polymer formed by the (co)polymerization of a polymerizable fluorine-containing monomer) permanently chemically bonded to all the surfaces of a microporous membrane substrate. For the purposes of this invention, the surface of the membrane refers not only to the two external, gross surfaces of the membrane but also to all the internal surfaces of the microporous structure which would contact a fluid during filtration. Preferred membranes of this invention are further characterized by having essentially the same resistance to air flow as the microporous membrane substrate.

The membranes of the invention are formed by contacting a microporous polymeric membrane with a solution comprising one or more polymerizable fluorine-containing monomers and exposing the membrane to ionizing radiation under conditions which polymerize the monomer(s) and result in a superstrate hydrophobic fluoropolymer which is chemically bonded to all the surfaces of the membrane substrate. By selecting the monomer or combination of monomers used, the CWST of the product can be controlled to have a specific value in the desired range.

There are fluoropolymer coatings which are commercially available which can be used to coat a microporous membrane to impart a low CWST to its surfaces. Some of these coatings include, for example, the fluorocarbon coatings FC741 and FC721 sold by the 3M Company. However, these coatings are not reactive with the membrane and are not permanent. They can, therefore, be washed off the membrane during use or during integrity testing. These coatings are also extremely expensive, with some costing thousands of dollars for one gallon. Furthermore, certain of these coatings are supplied using special fluorocarbon solvents which, during application, release fluorocarbon pollutants harmful to the ozone layer and the general environment unless expensive pollution control equipment is used, making the use of such materials impractical. Most important, however, is the fact that these coatings are not chemically bonded to the membrane and are fugitive.

The membranes of the present invention are unique in that they can be produced with a narrowly targeted CWST. These membranes (1) are not wettable by and therefore not subject to blocking by most process liquids encountered in important venting applications, (2) have low resistance to air flow and high vent flow rates, and (3) are in situ integrity testable by known means.

The membranes of the invention have a resistance to air flow that is essentially unchanged from that of the substrate membrane before the superstrate polymer is bonded thereto. This is an indication that the bonding occurs in an even, uniform way such that the pores are not significantly constricted by the bonded polymer.

The fluoropolymer is not easily removed, indicating that it is tightly bonded to the surface. The tightness of this bond can be tested by exposing the coated membrane to a fluorocarbon liquid (e.g., trichlorotrifluoroethane), such as is commonly used in integrity testing. The membrane is exposed to the liquid for several minutes and the CWST is tested before and after. Merely coated membranes show a distinct increase in CWST when subjected to such a test.

The membranes of this invention can conveniently be made by saturating a preformed microporous membrane with a solution of the desired polymerizable monomers in a suitable solvent and exposing the saturated membrane to gamma radiation so as to form a superstrate fluoropolymer chemically bonded onto all surfaces, including the pore surfaces and permanently to modify the CWST of the membrane.

The CWST of the resultant product is to some extent determined by factors such as the selection of monomers, their concentration, radiation dose rate, and the nature of the membrane substrate itself.

BEST MODE OF CARRYING OUT THE INVENTION

The membranes of this invention are prepared from preformed microporous polymeric membrane substrates. The membranes may be formed from any material which is a suitable substrate for the grafting of polymerizable ethylenically unsaturated monomers, initiated by ionizing radiation. Examples of suitable materials are polyolefins, polyamides, polyesters, polyurethanes, polysulfones, and fluoropolymers such as poly(vinylidene fluoride), polytetrafluoroethylene, perfluoroalkoxy resins, and others. It is only required that the reactive sites generated by the ionizing radiation at the polymer surface show sufficient reactivity to permit formation of a structure in which a polymeric superstrate is bonded to all the surfaces of the substrate membrane. While microporous membranes made of any of the above polymer types are suitable as substrates for this invention, and polyamides are particularly useful, those membranes which are already hydrophobic and which have a CWST less than about 35 dynes/cm, for example, those membranes made from polyolefins and fluoropolymers, are the more preferred substrates. Especially preferred as substrates are those membranes made of fluoropolymers. Poly(vinylidene fluoride) is most preferred as a substrate since it grafts readily and is stable to radiation.

The microporous membrane substrate is saturated with a solution of the desired polymerizable, fluorine-containing, ethylenically unsaturated monomer or monomers. Useful monomers include perfluoroalkyl acrylates, methacrylates and acrylamides, and other easily polymerized ethylenically unsaturated molecules containing a perfluoroalkyl group having a carbon chain from about 4 to about 13 atoms long. Preferred are those fluoroalkanesulfonamidoethyl acrylates and methacrylates which are available from the 3M Company under the tradenames FX-13, FX-14, and FX-189, respectively. Most preferred is the material known as FX-13, which is identified by 3M as 2-(N-ethylperfluorooctanesulfonamido)ethyl acrylate.

The fluorine-containing monomer may be used alone or in combination with other fluorine-containing monomers or together with other polymerizable, (non-fluorine-containing), ethylenically unsaturated monomers. Such non-fluorine-containing monomers may be both polar and non-polar and may include unsaturated acids, such as acrylic and methacrylic acid or their esters, such as hydroxyethyl or hydroxypropyl acrylate or methacrylate, or other alkyl esters of these acids derived from alcohols having from about 1 to about 18 carbon atoms. The selection of these comonomers will depend upon the desired CWST of the product. Thus, if the fluoroalkyl-containing monomer used alone produces a surface-modified microporous membrane with a CWST of, for example, 18 dynes/cm, and the desired CWST is 21 dynes/cm, the perfluoroalkyl monomer can be copolymerized with a copolymerizable monomer that does not decrease (or even that tends to increase) the CWST of the substrate polymer. This will tend to modify the effect of the perfluoroalkyl monomer such that the final CWST of surface-modified membrane substrate can be precisely controlled.

In general the use of ionizable monomers such as acrylic or methacrylic acid with the hydrophobic monomer results in a higher CWST. Selection of appropriate monomer systems can be guided by knowledge of reactivity ratios of monomers and their tendency to bond to polymer substrates using methods known to those skilled in the art.

The monomers may be dissolved in any suitable solvent or solvent mixture, as long as the solvent is inert to the polymerization reaction and will not affect the membrane substrate adversely. For the purpose of economy and simplified waste disposal, water-based systems are preferred. If a watermiscible solvent is required to permit complete dissolution of all the monomers, water-miscible tertiary alcohols are preferred. Most preferred as a solvent system is a mixture of 2-methylpropan-2-ol and water containing slightly more 2-methylpropan-2-ol than is sufficient to bring all components into solution.

The microporous membrane substrate is then saturated with the monomer solution by any appropriate means. Flat sheets of membrane may be dipped in a bath of solution, whereas continuous lengths of membrane may be saturated by known means of wet treatment of continuous, porous webs. For example, a continuous length of membrane may be passed through a bath containing the monomer solution, or it may be passed over a vacuum suction drum and monomer solution can be drawn through the membrane. Alternatively, an entire roll of continuous microporous membrane may be immersed in a vessel of monomer solution until fully and uniformly saturated with the solution.

Regardless of the manner in which a continuous length of membrane is saturated with the monomer solution, it is exposed to ionizing radiation. The preferred means for doing so is to interleave the saturated web with a porous non-woven web. (If the membrane had been saturated in roll form already interleaved in this fashion then re-rolling is not necessary.) The interleaved roll is then placed in a container (preferably a stainless steel canister) containing excess monomer solution which maintains the roll in contact with liquid monomer solution during exposure to radiation. Any source of ionizing radiation can be used that is capable of initiating polymerization but a preferred source is a $^{60}Co$ source. Any irradiation dose rate is acceptable provided that it yields a modified CWST with the desired surface properties and that the membrane substrate is not damaged by the radiation. Dose rates from about 5 to about 100 kilorads/hr and preferably from about 5 to about 70 kilorads/hr have been found effective. It is sometimes found that higher radiation rates in the broader range have the unexpected result of yielding membranes having a higher CWST than membranes prepared similarly but using a lower dose rate. While not wanting to be bound by any particular theory, it is believed that the higher CWST results from a decreased amount of grafting because the higher radiation rate promotes side reactions such as the formation of homopolymers of the polymerizing monomers which are not bonded to the substrate membrane. A dose rate of about 10 kilorads/hr and a total dose of 0.2 Mrads is preferred for grafting to membrane substrates made of poly(vinylidene fluoride).

After irradiation, the roll of membrane is preferably washed with water to remove polymeric debris that is not bonded to the substrate. Any means of washing which causes a flow of water tangential to the membrane and generally perpendicular to the length of the web is effective. Particularly effective is passing water tangentially through an interleaved roll or irradiated membrane.

Debris, which is usually a polymer of the polymerizing monomer(s), is often present, along with the surface-modified substrate, in the form of hard gel particles which can adhere to the membrane. Incorporation of a minor proportion of a polar monomer such as acrylic acid, methacrylic acid, or hydroxypropyl acrylate makes this debris more easily washed away by water.

After washing, the membrane may be dried by conventional means such as tunnel ovens or hot drum driers. Alternatively, it may be stored wet or processed further, depending on its end use.

The preparation and evaluation of microporous membranes having a CWST substantially lower than that of PTFE membranes is described below.

GENERAL PROCEDURE FOR MEASURING CRITICAL WETTING SURFACE TENSION (CWST)

The CWST of microporous membranes was determined by testing the membrane for its ability to be wetted by a series of pure normal paraffin liquids having known surface tensions. The liquids used in this test were:

| Liquid | Surface Tension[a] dynes/cm |
|---|---|
| n-Hexane | 18 |
| n-Heptane | 20 |
| n-Octane | 21 |
| n-Nonane | 22 |
| n-Decane | 23 |
| n-Undecane | 24 |
| n-Dodecane | 25 |
| Tetradecane | 26 |
| n-Hexadecane | 27 |

[a]Surface tension at 25° C. estimated from J. Phys. Chem. Ref. Data, Vol. 1, No. 4, 1972.

Normal paraffins having surface tensions significantly higher than those above are not liquid at room temperature. Therefore, to estimate CWSTs above 26 dynes/cm, the following non-hydrocarbon liquids were used as test liquids:

| | |
|---|---|
| acetonitrile | 29 dynes/cm |
| 12% by weight tertiary butyl alcohol in H$_2$O | 30 dynes/cm |
| 10% by weight tertiary butyl alcohol in H$_2$O | 33 dynes/cm. |
| 3% by weight tertiary butyl alcohol in H$_2$O | 35 dynes/cm |

A drop of each liquid was placed gently on the surface of the membrane tested using a glass pipet, starting with the liquid having the lowest surface tension. If the liquid wetted the membrane the membrane would be tested with the liquid having the next higher surface tension. This sequence was repeated until a liquid was found which did not wet the membrane. The critical wetting surface tension was defined to be the mean (rounded down to the nearest dyne/cm) of the surface tension of the liquid having the highest surface tension which wetted the membrane and the surface tension of the liquid having the lowest surface tension which did not wet the membrane.

GENERAL PROCEDURE FOR MEASURING AIR FLOW RESISTANCE

For the purposes of this disclosure the resistance to air flow was measured as the pressure drop across two layers of membrane required to cause a flow of air through the two layers at a face velocity of 7 ft/min at atmospheric pressure. This was measured using an apparatus built for this purpose. In this test two layers of membrane were held against a wire screen support and the side of the membrane away from the screen was pressurized with air until an air flow of 7 ft/min was attained. The region downstream of the support screen was open to the atmosphere. The pressure upstream of the membranes was measured and reported as the air flow resistance.

EXAMPLE 1

A dry, microporous poly(vinylidene fluoride) membrane manufactured by Pall Corporation, sold under the trademark Emflon ™ II, and having a pore size of 0.2 μm was immersed in a solution of 0.50 weight percent (based on the solvent weight) of FX-13 (a product of the 3M Company identified as 2-(N-ethylperfluorooctanesulfonamido)ethyl acrylate) in a mixture of 45% by weight tertiary butyl alcohol and 55% by weight water. The membrane was saturated with this solution. While being immersed in this liquid the membrane was exposed to gamma radiation from a $^{60}$Co source at a dose rate of 10 kilorads/hr for 20 hours. After being irradiated the membrane was removed from the solution and rinsed off with running deionized water and dried in an air oven at 100° C. for 10 minutes.

The CWST and air flow resistance of the dried membrane was measured according to the General Procedures above. The CWST of the membrane was found to be 21 dynes/cm compared with 34 dynes/cm measured for an untreated poly(vinylidene fluoride) membrane. The air flow resistance of the membrane was found to be 1.7 in. Hg, the same as that of an untreated membrane. The CWST and air flow resistance of the membrane of this Example and the untreated membrane (referred to as Control) are summarized below in Table I.

EXAMPLE 2

A dry, microporous poly(vinylidene fluoride) membrane manufactured by Pall Corporation and sold under the trademark Emflon ™ II having a pore size of 0.2 μm was treated as in Example 1, except that the concentration of FX-13 in the solution was 0.10 weight percent.

The dry membrane was found to have a CWST of 21 dynes/cm, much lower than that of the Control, and an air flow resistance of 1.6 in. Hg, essentially unchanged from that of the Control. This information is summarized in Table I.

EXAMPLE 3

A dry, microporous poly(vinylidene fluoride) membrane manufactured by Pall Corporation and sold under the trademark Emflon TM II having a pore size of 0.2 μm was treated as in Example 1, except that the concentration of FX-13 in the solution was 0.05 weight percent.

When the membrane was dry it was found to have a CWST of 24 dynes/cm, much lower than that of the untreated Control and also lower than that of Poreflon, a commercial, microporous PTFE membrane available from Sumitomo Electric having the same pore size. Its air flow resistance remained essentially unchanged from that of the Control. This information is summarized in Table I.

EXAMPLE 4

A dry, microporous poly(vinylidene fluoride) membrane manufactured by Pall Corporation and sold under the trademark Emflon TM II having a pore size of 0.2 μm was treated as in Example 1, except that the concentration of FX-13 in the solution was 0.01 weight percent.

When the membrane was dry it was found to have a CWST of 34 dynes/cm, about the same as that of the untreated Control and higher than that of a commercially available PTFE membrane having the same pore size. Its air flow resistance remained essentially unchanged from that of the Control. This information is summarized in Table 1.

The results in Table I show that treatment of poly(vinylidene fluoride) membranes according to the method of Example 1 using concentrations of FX-13 ranging from 0.05% to 0.50% by weight yielded microporous membranes having a CWST of 24 dynes/cm and less. These membranes were not wetted by liquids having surface tensions ranging from 25 dynes/cm to 27 dynes/cm, whereas these liquids did spontaneously wet both the Poreflon PTFE membrane and the untreated Control. The results in Table I also demonstrate that the air flow resistance of the treated membranes remained essentially unchanged from that of the Control.

TABLE I

| Membrane of Example | FX-13 (%) | CWST (dynes/cm) | Air Flow Resistance (in. Hg) |
| --- | --- | --- | --- |
| 1 | 0.50 | 21 | 1.7 |
| 2 | 0.10 | 21 | 1.6 |
| 3 | 0.05 | 24 | 1.6 |
| 4 | 0.01 | 34 | 1.6 |
| Control | — | 34 | 1.6 |
| Poreflon | — | 28 | N/A |

Examples 5–8 demonstrate that Certain comonomers may be added to the FX-13 treatment solution for the purpose of controlling the CWST of the product.

EXAMPLE 5

A dry, microporous poly(vinylidene fluoride) membrane manufactured by Pall Corporation and sold under the trademark Emflon TM II having a pore size of 0.2 μm was treated as in Example 1, except that the concentration of FX-13 in the solution was 0.15 weight percent.

When the membrane was dry, it was found to have a CWST of 22 dynes/cm, much lower than that of an untreated membrane (Control) and an air flow resistance of 1.7 in. Hg, essentially unchanged from that of an untreated Control. This information is summarized in Table II below.

EXAMPLE 6

A dry, microporous poly(vinylidene fluoride) membrane manufactured by Pall Corporation and sold under the trademark Emflon TM II having a pore size of 0.2 μm was treated as in Example 5, except that the treating solution further contained 0.05 weight percent methacrylic acid.

The dried product membrane was found to have a CWST of 22 dynes/cm, equal to that of the membrane of Example 5, and an air flow resistance of 1.8 in. Hg. This information is summarized in Table II below.

EXAMPLE 7

A dry, microporous poly(vinylidene fluoride) membrane manufactured by Pall Corporation and sold under the trademark Emflon TM II having a pore size of 0.2 μm was treated as in Example 5, except that the treating solution further contained 0.10 weight percent methacrylic acid.

The resultant membrane was found to have a CWST of 24 dynes/cm, slightly higher than that of the membrane of Example 5, but still significantly below that of Poreflon, a commercial PTFE membrane. Its air flow resistance was 1.8 in. Hg. This information is summarized in Table II below.

EXAMPLE 8

A dry, microporous poly(vinylidene fluoride) membrane manufactured by Pall Corporation and sold under the trademark Emflon TM II having a pore size of 0.2 μm was treated as in Example 5, except that the treating solution further contained 0.20 weight percent methacrylic acid.

The resultant membrane was found to have a CWST of 29 dynes/cm, significantly below that of an untreated membrane and just above that of a commercial PTFE membrane. Its air flow resistance was 1.8 in. Hg, slightly higher than that of the membrane of Example 5. This information is summarized in Table II below.

The results in Table II show that using a polar comonomer together with FX-13 leads to a product having a higher CWST than if the polar comonomer had not been used. The results further show that under the conditions used in Examples 6–8 as the amount of methacrylic acid used is increased to about 0.20 weight percent the CWST of the product is increased to that of a Poreflon PTFE membrane. The results in Table II also show that a membrane having a CWST as low as 19 dynes/cm can be obtained by using 2-ethylhexyl methacrylate together with FX-13.

Examples 9 and 10 demonstrate that the intensity of radiation used to effect the surface modification influences the CWST of the resultant membrane.

EXAMPLE 9

A dry, microporous poly(vinylidene fluoride) membrane manufactured by Pall Corporation and sold under the trademark Emflon TM II having a pore size of 0.2 μm was treated as in Example 1, except that the treating solution further contained 0.05 weight percent 2-ethylhexyl methacrylate.

The dried product membrane was found to have a CWST of 19 dynes/cm and an air flow resistance was 1.7 in. Hg. This is summarized in Table II below.

TABLE II

| Membrane of Example | FX-13 (%) | Methacrylic (%) | Ethyl Hexyl methacrylate (%) | CWST (dynes/cm) | Air Flow Resistance (in. Hg) |
|---|---|---|---|---|---|
| 5 | 0.15 | 0 | 0 | 22 | 1.7 |
| 6 | 0.15 | 0.05 | 0 | 22 | 1.8 |
| 7 | 0.15 | 0.10 | 0 | 24 | 1.8 |
| 8 | 0.15 | 0.20 | 0 | 29 | 1.8 |
| 1 | 0.50 | 0 | 0 | 21 | 1.7 |
| 9 | 0.50 | 0 | 0.05 | 19 | 1.7 |
| Control | — | — | — | 34 | 1.6 |
| Poreflon | — | — | — | 28 | N/A |

EXAMPLE 10

A dry, microporous poly(vinylidene fluoride) membrane manufactured by Pall Corporation and sold under the trademark Emflon ™ II having a pore size of 0.2 μm was treated as in Example 3, except that the dose Rate of the irradiation was 50 kilorads/hr.

The resultant membrane was found to have a CWST of 28 dynes/cm, higher than that of a membrane treated identically but irradiated at a dose rate of 10 kilorads/hr and about the same as the CWST of Poreflon, a commercial PTFE membrane. Its air flow resistance was 1.6 in. Hg, the same as that of an untreated membrane (Control). This is summarized in Table III below.

EXAMPLE 11

A dry, microporous poly(vinylidene fluoride) membrane manufactured by Pall Corporation and sold under the trademark Emflon ™ II having a pore size of 0.2 μm was treated as in Example 2, except that the dose rate of the radiation was 50 kilorads/hr.

The resultant membrane was found to have a CWST of 24 dynes/cm, somewhat higher than that of a membrane treated identically but irradiated at a dose rate of 10 kilorads/hr yet still significantly lower than the CWST of a PTFE membrane. Its air flow resistance was 1.6 in. Hg, the same as that of an untreated membrane (Control). This is summarized in Table III below.

As can be seen in Table III, in each case that irradiation was performed at a dose rate of 50 kilorads/hr the resultant CWST of the product was higher than that obtained at a dose rate of 10 kilorads/hr.

TABLE III

| Membrane of Example | FX-13 (%) | Dose Rate (krd/hr) | CWST (dynes/cm) | Air Flow Resistance (in. Hg) |
|---|---|---|---|---|
| 3 | 0.05 | 10 | 24 | 1.6 |
| 10 | 0.05 | 50 | 28 | 1.6 |
| 2 | 0.10 | 10 | 21 | 1.6 |
| 11 | 0.10 | 50 | 24 | 1.6 |
| Control | — | — | 34 | 1.6 |
| Poreflon | — | — | 28 | N/A |

Example 12 illustrates how a very low CWST membrane can be prepared directly from an undried membrane substrate, still wet from the membrane-forming process.

EXAMPLE 12

A dry, microporous poly(vinylidene fluoride) membrane having a pore size of 0.1 μm and having a nonwoven polypropylene internal support was prepared by conventional means, and all adjuvant materials were washed from the membrane using water. The water-wet membrane was then treated as described in Example 1.

The resultant membrane was found to have a CWST of 22 dynes/cm, significantly lower than that of a commercial PTFE membrane and much lower than that of an untreated membrane of the same type which was dried in the same manner as the membrane of this Example. The untreated membrane is referred to as Control 12 to distinguish it from the Control referred to in previous Examples. The air flow resistance of the treated membrane of this Example was 9.0 in. Hg, unchanged from that of Control 12. This information is summarized in Table IV below.

TABLE IV

| Membrane of Example | CWST (dynes/cm) | Air Flow Resistance (in. Hg) |
|---|---|---|
| 12 | 22 | 9.0 |
| Control 12 | 34 | 9.0 |
| Poreflon | 28 | N/A |

EXAMPLE 13 (COMPARATIVE)

This Example describes the preparation of a conventional coated membrane and the integrity of this coating, for the purposes of comparison with a grafted membrane according to the invention. A dry, microporous poly(vinylidene fluoride) membrane manufactured by Pall Corporation and sold under the trademark Emflon ™ II having a pore size of 0.2 μm was agitated gently for 5 minutes in a solution containing 0.5% by weight in a mixture of fluorocarbon solvents. The solution was prepared by diluting one part by volume of FC721 (a commercial fluorocarbon coating available from the 3M Company as a 2% by weight solution of a fluoropolymer composition in at least one fluorocarbon solvent) with 3 parts by volume Freon TF (a trichlorotrifluoroethane product of E. I. DuPont de Nemours, Inc.). The membrane was then removed from the solution and dried in an air oven at 100° C. for 10 minutes. The treated membrane was found to have a CWST of 22 dynes/cm.

The membrane of Comparative Example 13 was agitated gently for a total of 3 minutes in three successive portions of Freon TF, a liquid commonly used to integrity test filters containing hydrophobic filter membranes. After removal from the Freon, the membrane was dried in an air oven for 4 minutes at 100° C. The Freon TF-exposed membrane had a CWST of 30 dynes/cm, much higher than the CWST before exposure to the Freon TF and even higher than the CWST of Poreflon, a commercial microporous PTFE membrane.

The membrane of Example 1 was exposed to Freon TF for 3 minutes and dried in a similar fashion. After drying the CWST remained 21 dynes/cm, unchanged from its value prior to exposure to Freon TF.

The above results are summarized in Table V below. These results show that, after brief exposure to Freon TF, a hydrophobic membrane coated by methods previously known to the skilled artisan is no longer as hydrophobic as it was prior to Freon TF exposure, in fact, no longer as hydrophobic as a PTFE membrane. By contrast the membrane of the present invention retains its hydrophobicity upon exposure to Freon.

TABLE V

| Membrane of Example | CWST Before Freon Exposure | CWST After Freon Exposure |
|---|---|---|
| 13 (Comparative) | 22 dynes/cm | 29 dynes/cm |
| 1 | 21 dynes/cm | 21 dynes/cm |

EXAMPLE 14

A commercial PTFE membrane having a pore size of 0.2 μm (Poreflon, a product of Sumitomo Electric, Inc.) was treated in the manner described in Example 1, except that the concentration of FX-13 in the solution was 2.0% by weight and the solvent was a mixture of 55% by weight tertiary butyl alcohol and 45% by weight water.

The resultant membrane had a CWST of 19 dynes/cm, significantly lower than that of the untreated PTFE membrane, designated "Poreflon Control" in Table VI. The air flow resistance of the treated sample was measured to be 1.2 in. Hg, slightly lower than that of the Poreflon Control. This information is summarized in Table VI below.

The data in Table VI show that a PTFE membrane can be made even more hydrophobic, i.e., its CWST can be made lower, by treatment in accordance with the present invention.

TABLE VI

| Membrane of Example | CWST (dynes/cm) | Air Flow Resistance (in. Hg) |
|---|---|---|
| 14 | 19 | 1.3 |
| Poreflon Control | 28 | 1.5 |

We claim:

1. A process for the preparation of a microporous polymeric membrane which comprises polymerizing a polymerizable fluorine-containing monomer in the presence of a microporous polymeric membrane substrate such that the fluorine-containing monomer forms a polymeric superstrate that is permanently chemically bonded to all surfaces of the membrane.

2. A process according to claim 1 in which the membrane is contacted with a solution of the fluorine-containing monomer which is then subjected to polymerization conditions.

3. A process according to claim 1 in which the polymerizable fluorine-containing monomer is polymerized in the presence of a non-fluorine-containing ethylenically unsaturated monomer so as to form a copolymer that is permanently chemically bonded to the surfaces of the membrane.

4. A process according to claim 1 in which the polymerization is effected under the influence of ionizing radiation.

5. A process according to claim 4 in which the ionizing radiation is γ-radiation.

6. A process according to claim 5 in which an ionizing radiation dose rate of from about 5 to about 100 krad/hr is used.

7. A process according to claim 6 in which the radiation dose rate is from about 5 to about 15 krad/hr.

8. A process according to claim 4 in which the ionizing radiation is provided by a $^{60}$Co source.

9. A process according to claim 1 in which the microporous polymeric membrane is formed from a fluorine-containing polymer.

10. A process according to claim 9 wherein said fluorine-containing polymer is poly(vinylidene fluoride).

11. A process according to claim 1 in which the microporous polymeric membrane is formed from a polyamide.

12. A process according to claim 1 wherein said microporous polymeric membrane substrate is formed from a material selected from the group consisting of polyolefins, polyamides, polyesters, polyurethanes, polysulfones, poly(vinylidene fluoride); polytetrafluoroethylene and perfluoroalkoxy resins.

13. A process according to claim 1 wherein said microporous polymeric membrane substrate comprises a hydrophobic material having a CWST of less than about 35 dynes/cm.

14. A device for processing fluids which incorporates a microporous polymeric membrane having a CWST of less than about 28 dynes/cm and comprising a microporous polymeric membrane substrate and, permanently chemically bonded to all portions of the surface thereof, a superstrate fluoropolymer.

15. A device according to claim 14 wherein said microporous polymeric membrane substrate is formed from a material selected from the group consisting of polyolefins, polyamides, polyesters, polyurethanes, polysulfones, poly(vinylidene fluoride); polytetrafluoroethylene and perfluoroalkoxy resins.

16. A device for processing fluids which incorporates a microporous polymeric membrane having a CWST of less than about 28 dynes/cm and comprising a microporous, fluoropolymeric membrane substrate and, permanently chemically bonded to all portions of the surface thereof, a superstrate (co)polymer of a monomer having an ethylenically unsaturated group and a perfluoroalkyl group.

17. A gas filtration/drying process which comprises passing a gas through a microporous polymeric membrane having a CWST less than about 28 dynes/cm comprising a microporous polymeric membrane substrate and permanently chemically bonded to all portions of the surface thereof, a superstrate fluoropolymer.

18. A method of venting a gas from a vessel which comprises allowing the gas to vent through a microporous polymeric membrane having a CWST less than about 28 dynes/cm comprising a microporous polymeric membrane substrate and permanently chemically bonded to all portions of the surface thereof, a superstrate fluoropolymer.

19. A method of venting a gas from a vessel according to claim 18 wherein said microporous polymeric membrane substrate is formed from a material selected from the group consisting of polyolefins, polyamides, polyesters, polyurethanes, polysulfones, poly(vinylidene fluoride); polytetrafluoroethylene and perfluoroalkoxy resins.

20. A method of venting a gas from a vessel according to claim 18 wherein said microporous polymeric membrane substrate is poly(vinylidene fluoride).

21. A method of venting a gas from a vessel according to claim 18 wherein said superstrate fluoropolymer comprises a fluoroalkanesulfonamidoethyl acrylate.

22. A method of venting a gas from a vessel according to claim 21 wherein said superstrate fluoropolymer comprises a 2-(n-ethylperfluorooctanesulfonamido)ethyl acrylate.

23. A gas filtration/drying process according to claim 17 wherein said microporous polymeric membrane substrate is formed from a material selected from the group consisting of polyolefins, polyamides, polyesters, polyurethanes, polysulfones, poly(vinylidene fluoride); polytetrafluoroethylene and perfluoroalkoxy resins.

24. A gas filtration/drying process according to claim 17 wherein said microporous polymeric membrane substrate is poly(vinylidene fluoride).

25. A gas filtration/drying process according to claim 17 wherein said superstrate fluoropolymer comprises a fluoroalkanesulfonamidoethyl acrylate.

26. A gas filtration/drying process according to claim 25 wherein said superstrate fluoropolymer comprises a 2-(N-ethylperfluorooctanesulfonamido)ethyl acrylate.

27. A method of separating a gas from a liquid in a gas/liquid mixture which comprises allowing the gas to pass through a microporous polymeric membrane having a CWST less than about 28 dynes/cm comprising a microporous polymeric membrane substrate and permanently chemically bonded to all portions of the surface thereof, a superstrate fluoropolymer.

28. A method of separating a gas from a liquid in a gas/liquid mixture according to claim 27 wherein said microporous polymeric membrane substrate is formed from a material selected from the group consisting of polyolefins, polyamides, polyesters, polyurethanes, polysulfones, poly(vinylidene fluoride); polytetrafluoroethylene and and perfluoroalkoxy resins.

29. A method of separating a gas from a liquid in a gas/liquid mixture according to claim 27 wherein said microporous polymeric membrane substrate is poly(vinylidene fluoride).

30. A method of separating a gas from a liquid in a gas/liquid mixture according to claim 27 wherein said superstrate fluoropolymer comprises a fluoroalkanesulfonamidoethyl acrylate.

31. A method of separating a gas from a liquid in a gas/liquid mixture according to claim 30 wherein said superstrate fluoropolymer comprises a 2-(N-ethylperfluorooctanesulfonamido)ethyl acrylate.

* * * * *

UNITED STATES PATENT AND TRADEMARK OFFICE
CERTIFICATE OF CORRECTION

PATENT NO. : 5,232,600
DATED : August 3, 1993
INVENTOR(S) : Degen et al.

It is certified that error appears in the above-indentified patent and that said Letters Patent is hereby corrected as shown below:

Claim 22, column 14, line 68, change "2-(n-ethylperfluoroocta-nesul-- to --2-(N-ethylperfluorooctanesul--.

Claim 28, column 16, line 9, delete "and" (second occurrence).

Signed and Sealed this

Fifth Day of April, 1994

Attest:

BRUCE LEHMAN

Attesting Officer

Commissioner of Patents and Trademarks